United States Patent
Guo et al.

(10) Patent No.: US 12,541,238 B2
(45) Date of Patent: Feb. 3, 2026

(54) METHOD OF READING INFORMATION OF POWER SUPPLY UNIT, SERVER, AND COMPUTER READABLE STORAGE MEDIUM THEREOF

(71) Applicant: Shenzhen Fulian Fugui Precision Industry Co., Ltd., Shenzhen (CN)

(72) Inventors: Li-Wen Guo, Shenzhen (CN); Ke-Feng You, Shenzhen (CN); Hui-Bo Liu, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 338 days.

(21) Appl. No.: 18/212,236

(22) Filed: Jun. 21, 2023

(65) Prior Publication Data

US 2024/0402780 A1     Dec. 5, 2024

(30) Foreign Application Priority Data

May 30, 2023   (CN) .......................... 202310628616.2

(51) Int. Cl.
   *G06F 1/28*        (2006.01)
(52) U.S. Cl.
   CPC ..................................... *G06F 1/28* (2013.01)
(58) Field of Classification Search
   CPC ..... G06F 1/32; G06F 1/12; G06F 9/44; G06F 1/28
   See application file for complete search history.

(56) References Cited

U.S. PATENT DOCUMENTS

2011/0029798 A1*  2/2011  Munjal ................. G06F 1/3228
                                                  713/340
2022/0292441 A1*  9/2022  Morita ................... G06Q 50/04

FOREIGN PATENT DOCUMENTS

TW          201627809 A        8/2016
TW          202008110 A        2/2020

* cited by examiner

*Primary Examiner* — Keshab R Pandey
(74) *Attorney, Agent, or Firm* — ScienBiziP, P.C.

(57) ABSTRACT

A method of reading information of a power supply unit (PSU) includes reading working information of the PSU at a predefined time interval. The working information is stored in a predefined storing space. When receiving a searching request sent to PSU from the computing device assembly, the working information is acquired from the predefined storing space and transmitted to the corresponding computing device assembly. The working information of the PSU is pre-read and stored, when several computing device assemblies read the working information of the PSU by the searching request at the same time, there is no issue of competition for resource, and the problem of the computing device assemblies being unable to access the PSU is avoided. Thus, a computing strategy of computing systems corresponding to the computing device assemblies is normally executed. A server and a computer readable storage medium are also disclosed.

15 Claims, 6 Drawing Sheets

METHOD OF READING INFORMATION OF POWER SUPPLY UNIT, SERVER, AND COMPUTER READABLE STORAGE MEDIUM THEREOF

FIELD

The subject matter herein generally relates to power management technology, and particular to a method of reading information of a power supply unit and a server.

BACKGROUND

Currently, for increasing a computing capability of unit volume in a server, several computing device assemblies are set in a server chassis. Each computing device assembly form a computing system. In that means the server defines several computing systems for increasing a computing capability. The computing device assemblies are powered by a common power supply unit (PSU). According to a management mechanism of the server, the computing system sends a searching request sent to the PSU at a time interval for reading working information of the PSU, thus a computing strategy of the computing system is adjusted according to the working information.

In a related art, the server includes a plurality of computing device assemblies and a power supply unit (PSU). Each of the plurality of computing device assemblies connects with the PSU through a power management bus (PMBUS) for transmitting a searching request sent to the PSU and acquiring working information of the PSU. In the server with the plurality of computing device assemblies, the plurality of computing device assemblies may access the PSU at the same time through the PMBUS, there is a competition for resource between the plurality of computing device assemblies, it will cause some of the plurality of computing device assemblies is unable to access the PSU, thus the normal executed computing strategy of the computing device assembly being unable to accessed the PSU is affected.

There is room for improvement in the art.

BRIEF DESCRIPTION OF THE DRAWINGS

Implementations of the present disclosure will now be described, by way of example only, with reference to the attached figures.

DETAILED DESCRIPTION

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements.

It should be understood that, in this embodiment of the present disclosure, "at least one" means one or more, and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. In the specification, claims, and accompanying drawings of the present disclosure, the terms "first", "second", "third", "fourth", and so on are intended to distinguish between similar objects but are not intended to indicate specific order or a sequence.

In addition, it should be noted that the methods disclosed in the embodiments of the present disclosure or the methods shown in the flowcharts include one or more blocks for implementing the methods, and the one or more blocks are not deviated from the scope of the claims. The order of execution can be interchanged with each other, and some of the one or more blocks can also be deleted.

Currently, for increasing a computing capability of unit volume in a server, several computing device assemblies are set in a server chassis. Each computing device assembly form a computing system. In that means the server defines several computing systems for increasing a computing capability. The computing device assemblies are powered by a common power supply unit (PSU). According to a management mechanism of the server, the computing system sends a searching request sent to the PSU at a time interval for reading working information of the PSU, thus a computing strategy of the computing system is adjusted according to the working information.

Figure 1:
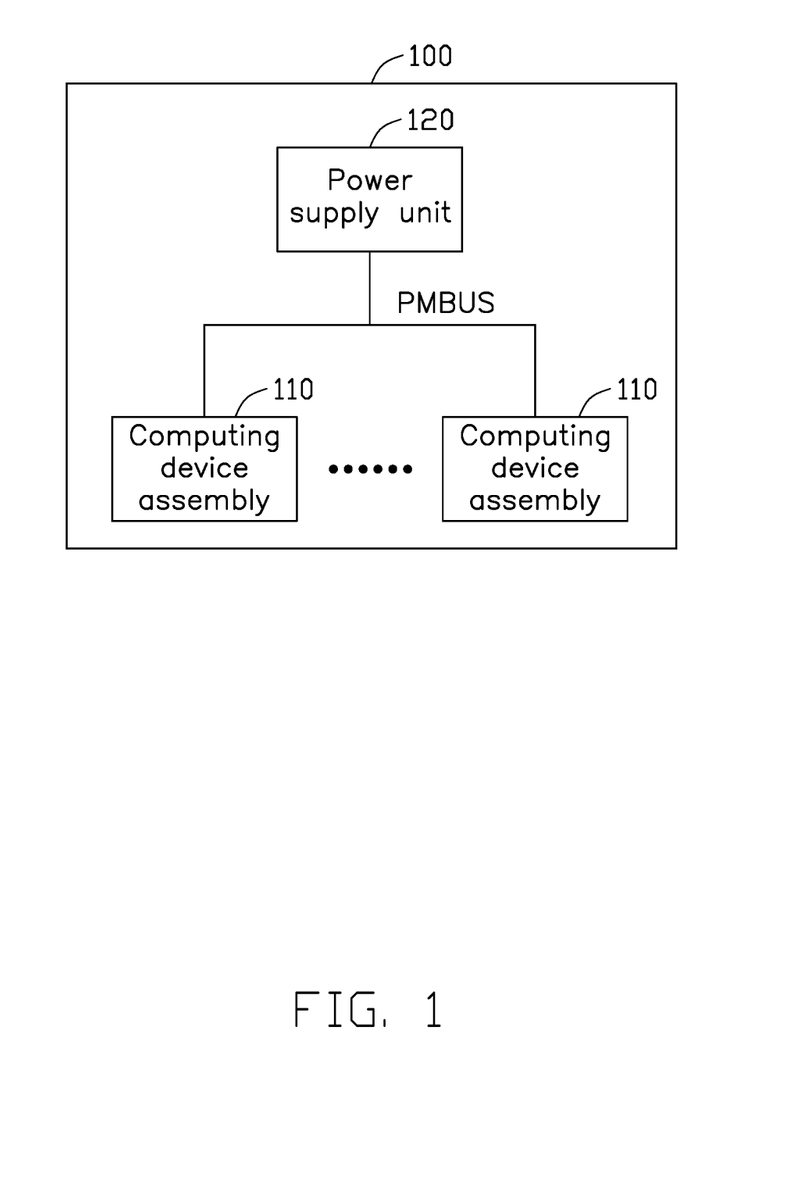
FIG. 1 is a diagram illustrating an embodiment of a server in a related art.

In a related art, FIG. 1 shows a server 100 in the related art. The server 100 includes a plurality of computing device assemblies 110 and a power supply unit (PSU) 120. Each of the plurality of computing device assemblies 110 connects with the PSU 120 through a power management bus (PMBUS) for transmitting a searching request sent to the PSU 120 and acquiring working information of the PSU 120. In the server 100 with the plurality of computing device assemblies 110, the plurality of computing device assemblies 110 may access the PSU 120 at the same time through the PMBUS, there is a competition for resource between the plurality of computing device assemblies 110, it will cause some of the plurality of computing device assemblies 110 is unable to access the PSU 120, thus the normal executed computing strategy of the computing device assembly being unable to accessed the PSU 120 is affected.

Based on above, the present disclosure provides a method of reading information of power supply unit (PSU) and a server, which may avoid computing device assembles in the server from being unable to access the PSU, thus a computing strategy of each of the computing device assemblies may be normally operated.

Figure 2:
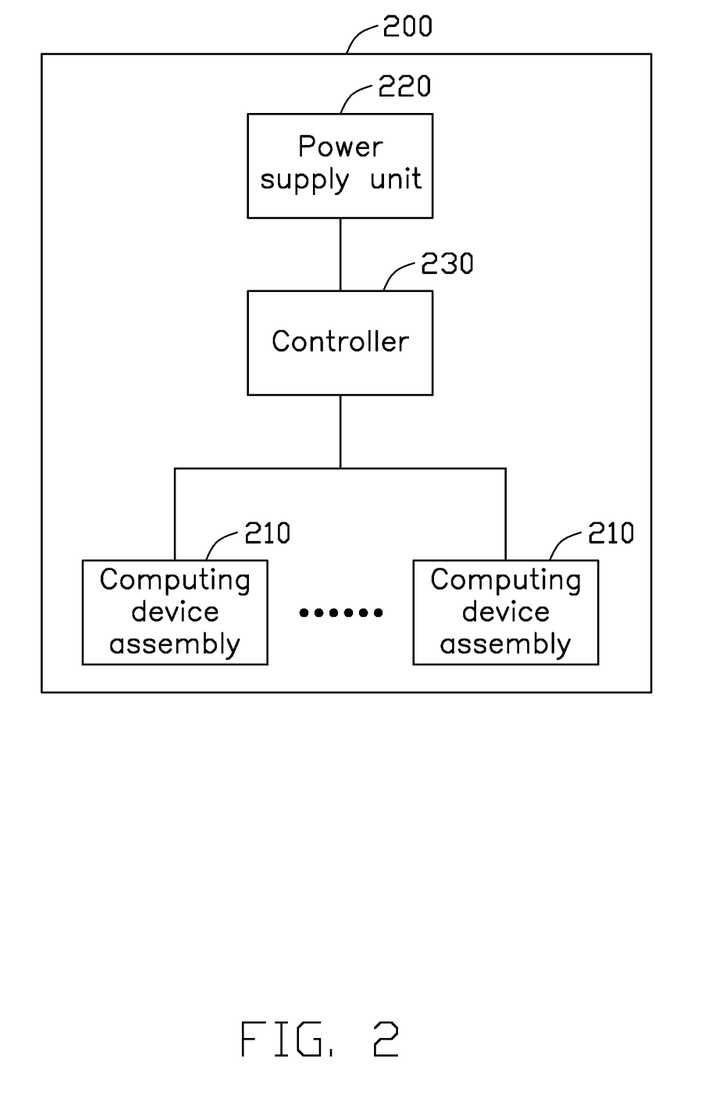
FIG. 2 is a diagram illustrating an embodiment of a server according to the present disclosure.

Referring to FIG. 2, FIG. 2 shows a diagram of a server 200 of the present disclosure. The server 200 includes a plurality of computing device assemblies 210, a PSU 220, and a controller 230. The PSU 220 is configured to power each of the plurality of the computing device assemblies 210, the controller 230 is electrically connected with the PSU 220 and the plurality of the computing device assemblies 210 through signal lines. The signal lines include a power management bus (PMBUS).

Figure 3:
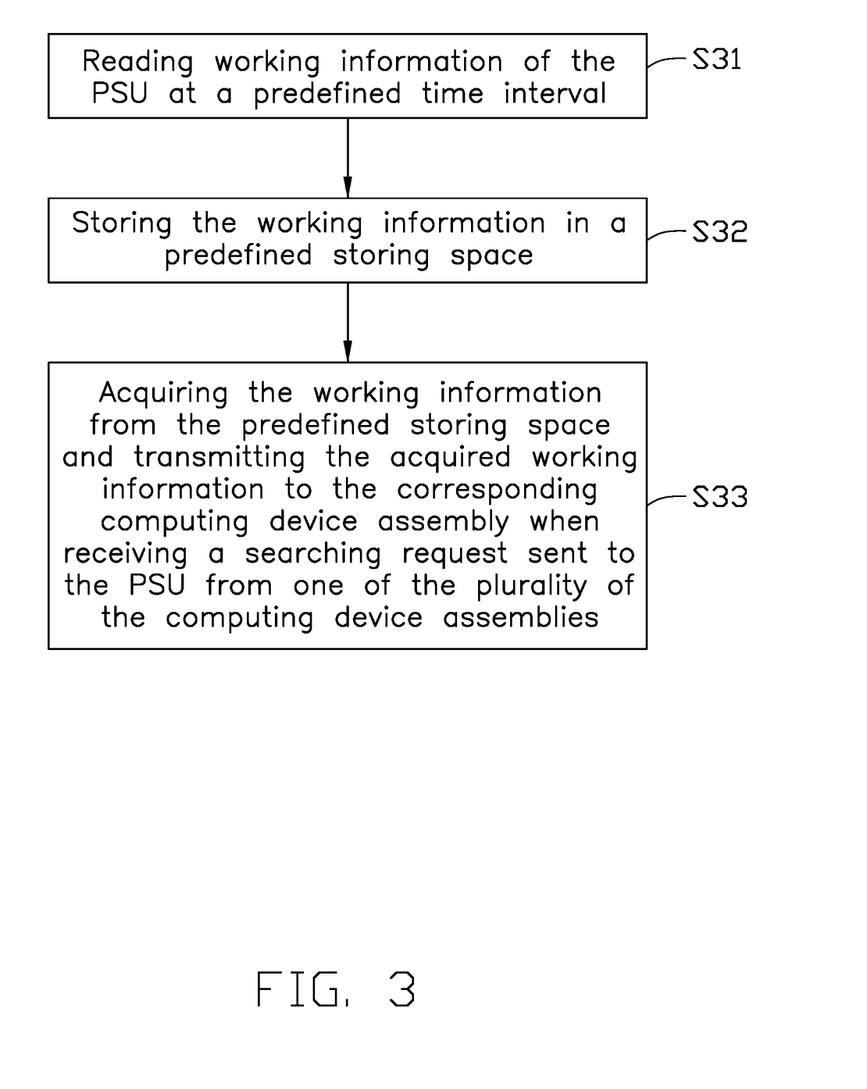
FIG. 3 is a flowchart illustrating a first embodiment of a method of reading information of a power supply unit according to the present disclosure.

Referring to FIG. 3, FIG. 3 shows a first embodiment of a flowchart of the method of reading information of the PSU. The method may include at least the following steps, which also may be re-ordered.

In block S31, working information of the PSU 220 is read at a predefined time interval.

In one embodiment, the controller 230 in the server 200 may read the working information of the PSU 220 according to the predefined time interval. In that mean, before the plurality of the computing device assemblies 210 generate a requirement of reading the working information of the PSU 220, the controller 230 pre-reads the working information of the PSU 220.

The controller 230 may be a processor, but not limited. In one embodiment, a type and a position of the controller 230 is not limited, which is able to read the working information of the PSU 220. For example, in same scenes, the controller 230 may be a processor in the server 200. In other scenes, the controller 230 may be set in the PSU 220, such as a backplane of the PSU 220.

In block S32, the working information is stored in a predefined storing space.

In one embodiment, after acquiring the working information of the PSU 220, the controller 230 stores the working information in the predefined storing space. The predefined storing space may a data storing space in the controller 230, or a data storing space in the server 200, not being limited.

In block S33, when receiving a searching request sent to the PSU 220 from one of the plurality of the computing device assemblies 210, the working information is acquired from the predefined storing space and the acquired working information is transmitted to the corresponding computing device assembly.

In one embodiment, when receiving the searching request sent to the PSU 220 from one of the plurality of the computing device assemblies 210, the controller 230 acquires a latest working information of the PSU 220 from the predefined storing space and transmits the acquired latest working information to the computing device assembly generated the searching request. When receiving the searching request sent to the PSU 220 from some of the plurality of the computing device assemblies 210, the controller 230 transmits the acquired latest working information to the corresponding computing device assemblies at the same time.

It is understood that in the present disclosure the working information of the PSU 220 is read at the predefined time interval and is stored, when receiving searching request sent to the PSU 220 from the plurality of the computing device assemblies 210, the working information is acquired from the predefined storing space and is transmitted to the corresponding computing device assembly 210. Therefore, even some of the plurality of the computing device assemblies 210 read the working information of the PSU 220 by the searching request at the same time, there is no issue of competition for resource, and the problem of the plurality of the computing device assemblies 210 being unable to access the PSU 220 in the server 200 with multi-computing systems is avoided. Thus, a computing strategy of the computing systems corresponding to the plurality of the computing device assemblies 210 is normally executed.

Figure 4:
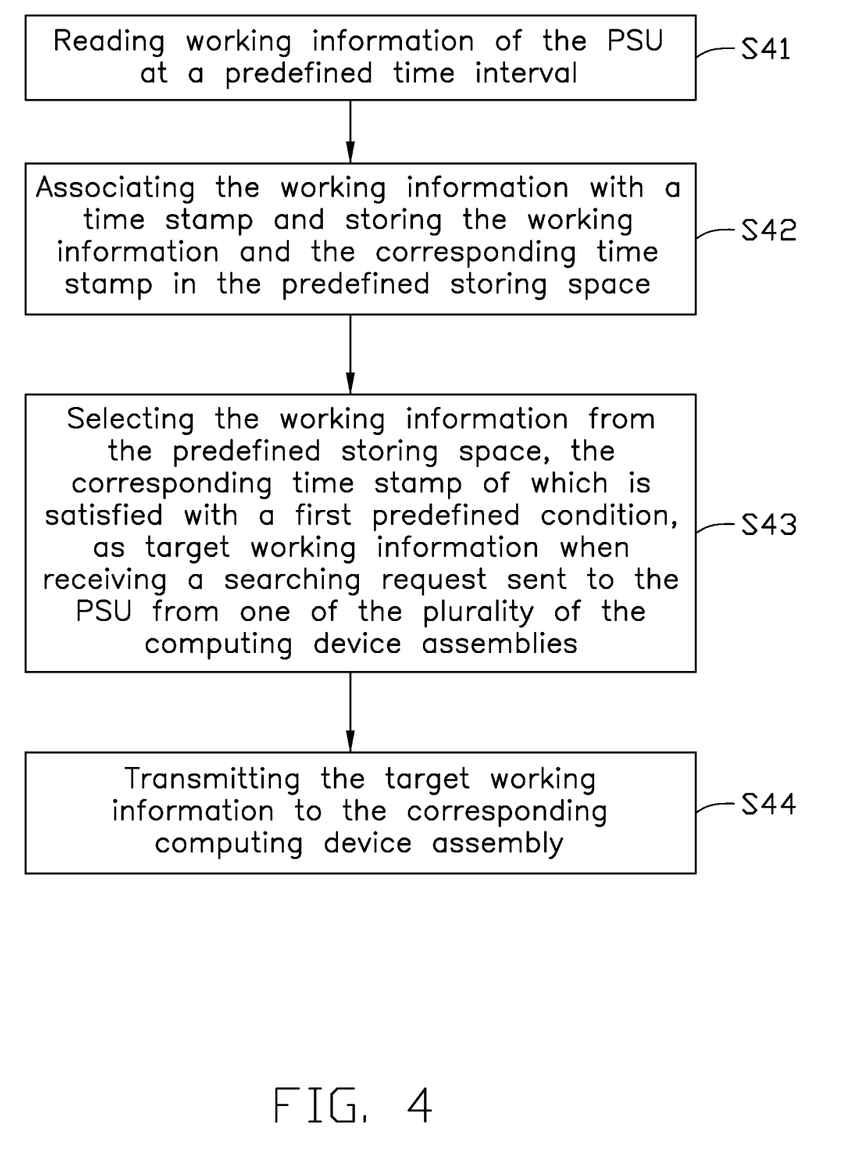
FIG. 4 is a flowchart illustrating a second embodiment of a method of reading information of a power supply unit according to the present disclosure.

Referring to FIG. 4, FIG. 4 shows a second embodiment of a flowchart of the method of reading information of the PSU. The method may include at least the following steps, which also may be re-ordered.

In block S41, working information of the PSU 220 is read at a predefined time interval.

The block S41 is the same as the block S31, details are not described herein again.

In block S42, each working information is associated with a time stamp and then the working information and the corresponding time stamp are stored in the predefined storing space.

In one embodiment, at the time of acquiring the working information of the PSU 220, the controller 230 also generates the corresponding time stamp according to the time of acquiring process, associates the working information with the generated time stamp, and then storing the working information and the corresponding time stamp in the predefined storing space. The time stamp reflects the time point corresponding to the working information for analyzing a working condition of the PSU 220.

In block S43, when receiving a searching request sent to the PSU 220 from the one of the plurality of the computing device assemblies 210, the working information is selected from the predefined storing space, the corresponding time stamp of which is satisfied with a first predefined condition, as target working information.

In block S44, the target working information is transmitted to the corresponding computing device assembly 210.

In one embodiment, when receiving the searching request(s) to the PSU 220 from one of the plurality of the computing device assemblies 210 or from some of the plurality of the computing device assemblies 210, the controller 230 selects the target working information from the predefined storing space being satisfied with the first predefined condition according to the time stamp.

The first predefined condition includes: a time difference between a current time and the time stamp is less than or equal to a first predefined value. In that means, by the first predefined value, the working information close to the current time is selected from the predefined storing space as the target working information.

Figure 5:
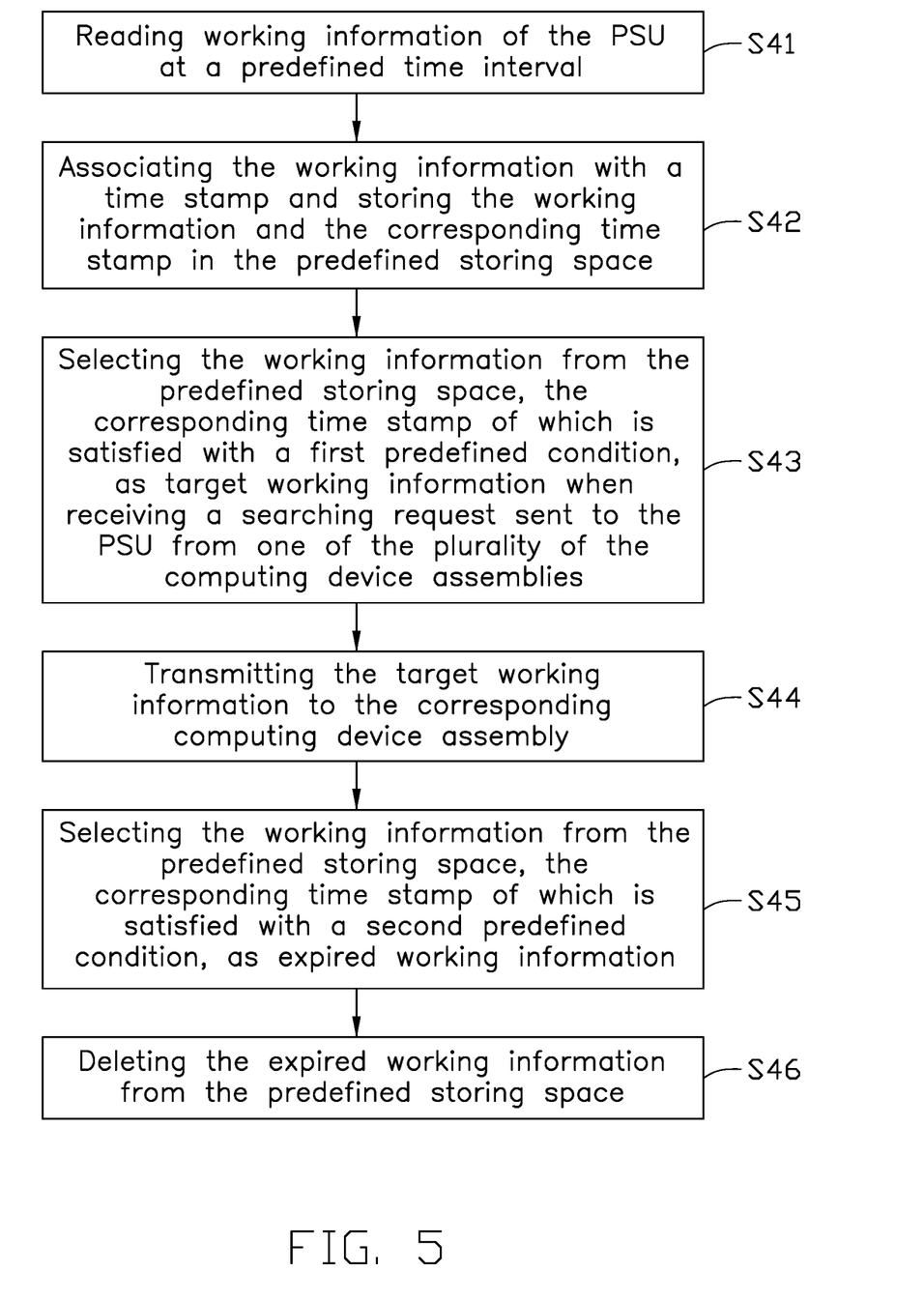
FIG. 5 is a flowchart illustrating a third embodiment of a method of reading information of a power supply unit according to the present disclosure.

Referring to FIG. 5, FIG. 5 shows a third embodiment of a flowchart of the method of reading information of the PSU. The difference between the method as shown in FIG. 4 and the method shown in FIG. 5 is that the method as shown in FIG. 5 may further include at least the following steps, which also may be re-ordered.

In block S45, the working information is selected from the predefined storing space, the corresponding time stamp of which is satisfied with a second predefined condition, as expired working information.

In block S46, the expired working information is deleted from the predefined storing space.

In one embodiment, the controller 230 may clear the expired working information in time for ensuring the predefined storing space from being occupied by the expired working information for a long time. The controller 230 selects the expired working information from the predefined storing space according to the time stamp and the second predefined condition. In detail, the second predefined condition includes: a time difference between a current time and the time stamp being less than or equal to a second predefined value. That is, the expired working information is the working information, the corresponding time stamp of which is far from the current time.

In some embodiments, the second predefined value is larger than the first predefined value.

Figure 6:
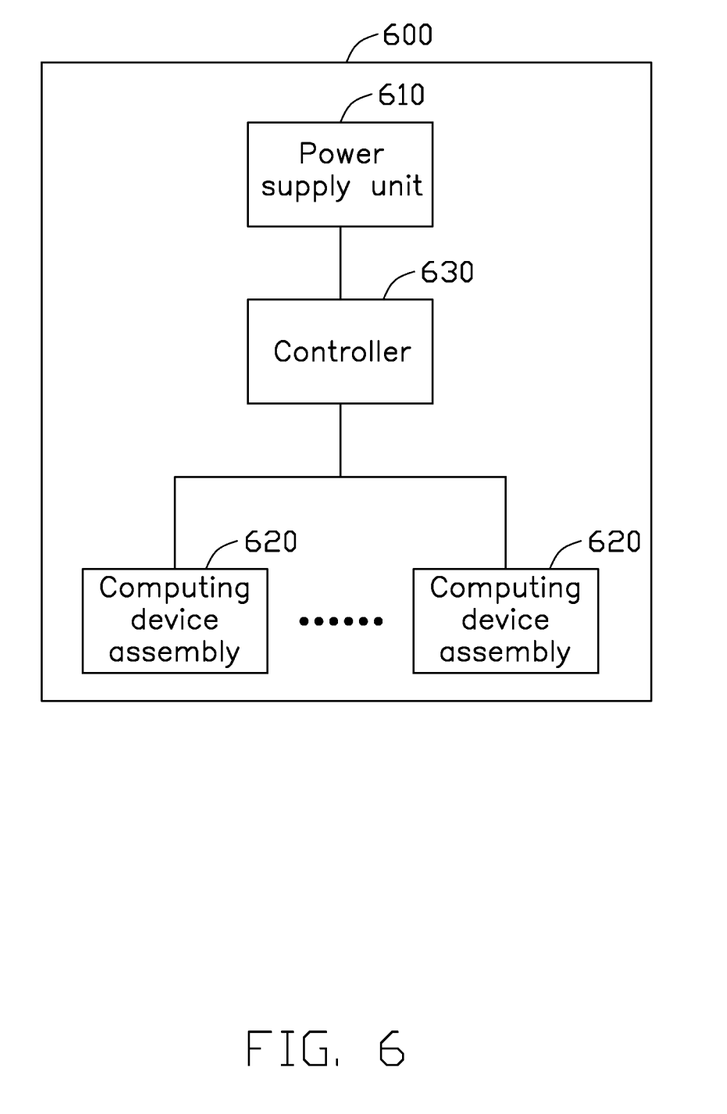
FIG. 6 is a diagram illustrating an embodiment of a server according to the present disclosure.

Referring to FIG. 6, FIG. 6 shows a diagram of the server 600 of the present disclosure. The server 600 includes a PSU 610, a plurality of computing device assemblies 620, and a controller 630. The PSU 610 is configured to power each of the plurality of the computing device assemblies 620, the controller 630 is electrically connected with the PSU 610 and the plurality of the computing device assemblies 620 through signal lines. The signal lines include a power management bus (PMBUS).

The controller 630 is configured to read working information of the PSU 610 at a predefined time interval, store the working information in a predefined storing space, acquire the working information from the predefined storing space when receiving a searching request sent to the PSU 610 from one of the plurality of the computing device assemblies 620, and transmit the acquired working information to the corresponding computing device assembly 620. The controller 630 is also configured to associate each working information with a time stamp and store the working information and the corresponding time stamp in the predefined storing space.

The controller 630 also is configured to select the working information from the predefined storing space, the corresponding time stamp of which is satisfied with a first predefined condition, as target working information and transmit the target working information to the corresponding computing device assembly 620. The first predefined condition includes: a time difference between a current time and the time stamp is less than or equal to a first predefined value.

The controller 630 also is configured to select the working information from the predefined storing space, the corresponding time stamp of which is satisfied with a second predefined condition, as expired working information and delete the expired working information from the predefined storing space. The second predefined condition includes: a time difference between a current time and the corresponding time stamp is larger than a second predefined value.

The implementation principle and the beneficial effect of the server 600 of the present disclosure can refer to the detail description of the method. Details are not described herein again.

The present discloses also provides a computer readable storage medium. The computer readable storage medium stores computer programs or codes, when being executed to perform the foregoing method of reading information of the PSU.

In the above embodiments, all or some of the procedures or functions may be implemented by using software, hardware, firmware, or any combination thereof. When software is used for implementation, all or some of the procedures or functions may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM). If there is no conflict, the technical features in embodiments and implementations of this application may be randomly combined.

The protective scope of the present disclosure is not limited by the above exemplary embodiments. It should be apparent to those skilled in the art that various modifications, combinations, sub-combinations and replacements may be made according to design requirements and other factors. Those modifications, equivalent replacements and improvements should be made without departing from the spirit and principle of the present disclosure, and shall fall within the scope of the present disclosure.

What is claimed is:

1. A method of reading information of a power supply unit (PSU), being applicable in a server; the server comprising the PSU and at least one computing device assembly; the PSU is configured to power the at least one computing device assembly; the server further comprises a storage medium with computer instructions and a processor; and the processor executes the computer instructions to implement following processes:
    reading working information of the PSU at a predefined time interval;
    storing the working information in a predefined storing space in the server; and
    acquiring, when receiving a searching request sent to PSU from the at least one computing device assembly, the working information from the predefined storing space and transmitting the acquired working information to the at least one computing device assembly;
    wherein storing the working information in the predefined storing space in the server further comprises:
    associating the working information with a corresponding time stamp and storing the working information and the corresponding time stamp in the predefined storing space.

2. The method of claim 1, wherein acquiring the working information from the predefined storing space and transmitting the acquired working information to the at least one computing device assembly further comprises:
    selecting the acquired working information from the predefined storing space, the corresponding time stamp of which is satisfied with a first predefined condition, as target working information; and transmitting the target working information to the at least one computing device assembly.

3. The method of claim 2, wherein the first predefined condition is provided with a time difference between a current time and the corresponding time stamp, and the time difference is less than or equal to a first predefined value.

4. The method of claim 1, the processor further implement following processes:

selecting the acquired working information from the predefined storing space, the corresponding time stamp of which is satisfied with a second predefined condition, as expired working information; and deleting the expired working information in the predefined storing space.

5. The method of claim 4, wherein the second predefined condition is provided with a time difference between a current time and the corresponding time stamp, and the time difference is larger than a second predefined value.

6. A server comprising a power supply unit (PSU), at least one computing device assembly, and a controller; the PSU is configured to power the at least one computing device assembly; the controller connects with the PSU and the at least one computing device assembly through signal lines; and the controller is configured to implement following processes:

reading working information of the PSU at a predefined time interval;

storing the working information in a predefined storing space in the server; and acquiring, when receiving a searching request sent to PSU from the at least one computing device assembly, the working information from the predefined storing space and transmitting the acquired working information to the at least one computing device assembly;

wherein storing the working information in the predefined storing space in the server further comprises:

associating the working information with a corresponding time stamp and storing the working information and the corresponding time stamp in the predefined storing space.

7. The server of claim 6, wherein acquiring the working information from the predefined storing space and transmitting the acquired working information to the at least one computing device assembly further comprises:

selecting the acquired working information from the predefined storing space, the corresponding time stamp of which is satisfied with a first predefined condition, as target working information; and transmitting the target working information to the at least one computing device assembly.

8. The server of claim 7, wherein the first predefined condition is provided with a time difference between a current time and the corresponding time stamp, and the time difference is less than or equal to a first predefined value.

9. The server of claim 6, wherein the controller is further configured to implement following processes:

selecting the acquired working information from the predefined storing space, the corresponding time stamp of which is satisfied with a second predefined condition, as expired working information; and deleting the expired working information in the predefined storing space.

10. The server of claim 9, wherein the second predefined condition is provided with a time difference between a current time and the corresponding time stamp, and the time difference is larger than a second predefined value.

11. A non-transitory computer readable storage medium, which stores computer programs, and the computer programs are executed by at least one processor to implement following processes:

reading working information of the PSU at a predefined time interval;

storing the working information in a predefined storing space in the server; and acquiring, when receiving a searching request sent to PSU from the at least one computing device assembly, the working information from the predefined storing space and transmitting the acquired working information to the at least one computing device assembly;

wherein storing the working information in a predefined storing space in the server further comprising:

associating the working information with a corresponding time stamp and storing the working information and the corresponding time stamp in the predefined storing space.

12. The non-transitory computer readable storage medium of claim 11, wherein acquiring the working information from the predefined storing space and transmitting the acquired working information to the at least one computing device assembly further comprises:

selecting the acquired working information from the predefined storing space, the corresponding time stamp of which is satisfied with a first predefined condition, as target working information; and transmitting the target working information to the at least one computing device assembly.

13. The non-transitory computer readable storage medium of claim 12, wherein the first predefined condition is provided with a time difference between a current time and the corresponding time stamp, and the time difference is less than or equal to a first predefined value.

14. The non-transitory computer readable storage medium of claim 11, wherein the at least one processor further implements following processes:

selecting the working information from the predefined storing space, the corresponding time stamp of which is satisfied with a second predefined condition, as expired working information; and deleting the expired working information in the predefined storing space.

15. The non-transitory computer readable storage medium of claim 14, wherein the second predefined condition is provided with a time difference between a current time and the corresponding time stamp, and the time difference is larger than a second predefined value.

* * * * *